US010626663B2

(12) United States Patent
Schreiber et al.

(10) Patent No.: US 10,626,663 B2
(45) Date of Patent: Apr. 21, 2020

(54) SPACER FOR INSULATING GLAZING UNITS

(71) Applicant: SAINT-GOBAIN GLASS FRANCE, Courbevoie (FR)

(72) Inventors: Walter Schreiber, Aachen (DE); Martin Rigaud, Pfungen (CH); Hans-Werner Kuster, Aachen (DE)

(73) Assignee: SAINT-GOBAIN GLASS FRANCE, Courbevoie (FR)

(*) Notice: Subject to any disclaimer, the term of this patent is extended or adjusted under 35 U.S.C. 154(b) by 0 days.

(21) Appl. No.: 15/506,229

(22) PCT Filed: Sep. 18, 2015

(86) PCT No.: PCT/EP2015/071452
§ 371 (c)(1),
(2) Date: Feb. 23, 2017

(87) PCT Pub. No.: WO2016/046081
PCT Pub. Date: Mar. 31, 2016

(65) Prior Publication Data

US 2017/0298680 A1 Oct. 19, 2017

(30) Foreign Application Priority Data

Sep. 25, 2014 (EP) .................................... 14186342

(51) Int. Cl.
*B32B 7/02* (2019.01)
*E06B 3/663* (2006.01)
*E06B 3/673* (2006.01)

(52) U.S. Cl.
CPC ...... *E06B 3/66314* (2013.01); *E06B 3/66319* (2013.01); *E06B 3/66333* (2013.01);
(Continued)

(58) Field of Classification Search
CPC ... E06B 2003/66338; E06B 2003/6638; E06B 3/66314; E06B 3/66319; E06B 3/66333;
(Continued)

(56) References Cited

U.S. PATENT DOCUMENTS 2,094,381 A 9/1937 Slayter
2,303,897 A 12/1942 Smith
(Continued)

FOREIGN PATENT DOCUMENTS

AL 102010006127 A1 8/2011
CA 2275448 A1 7/1998
(Continued)

OTHER PUBLICATIONS

Kassnel, DE 102009057-156 A1, 09, 2011.*
(Continued)

*Primary Examiner* — Lawrence D Ferguson
(74) *Attorney, Agent, or Firm* — Pillsbury Winthrop Shaw Pittman LLP

(57) ABSTRACT

A spacer for multipane insulating glazing units includes a polymeric main body having two pane contact surfaces running parallel to one another, a glazing interior surface and, an adhesive bonding surface. The pane contact surfaces, and the adhesive bonding surface are connected directly or via connection surfaces. The spacer also includes an insulation film, which is applied on the adhesive bonding surface.

13 Claims, 3 Drawing Sheets

Figure 1:
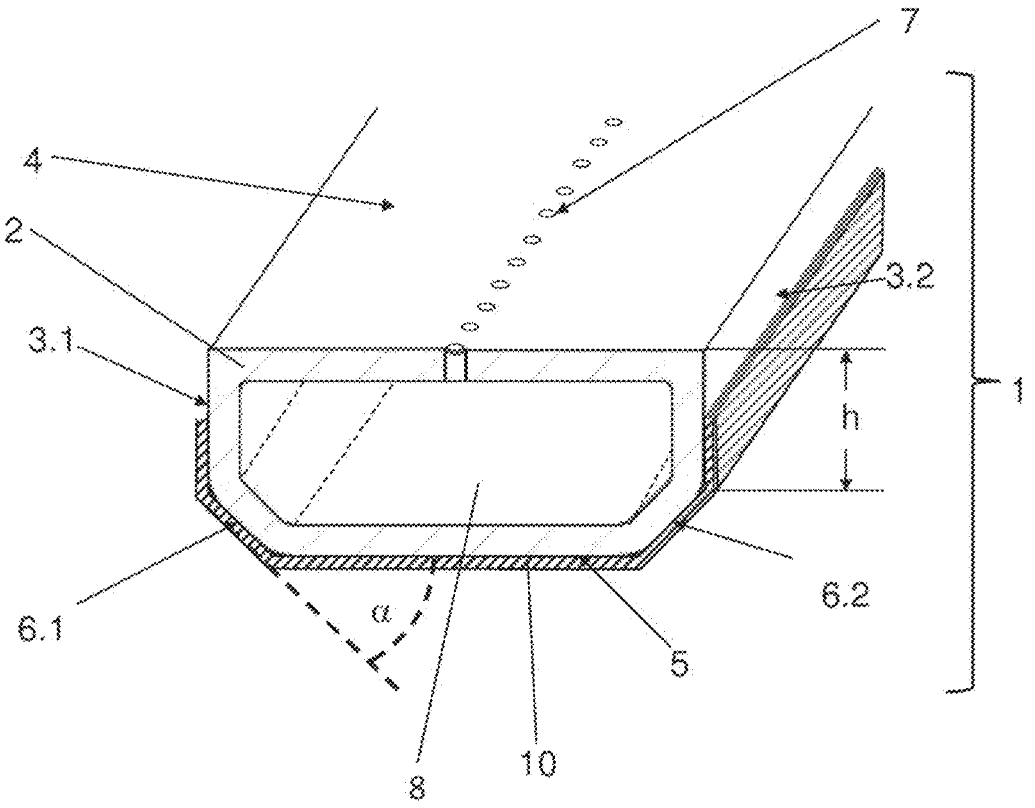

(52) U.S. Cl.
CPC ...... *E06B 3/66352* (2013.01); *E06B 3/66342* (2013.01); *E06B 3/67326* (2013.01); *E06B 2003/6638* (2013.01); *E06B 2003/66338* (2013.01)

(58) Field of Classification Search
CPC ............. E06B 3/66342; E06B 3/66352; E06B 3/67326
See application file for complete search history.

(56) References Cited

U.S. PATENT DOCUMENTS 2,834,999 A 5/1958 Taylor et al.
3,168,089 A 2/1965 Larkin
3,793,276 A 2/1974 Blunt et al.
3,935,683 A 2/1976 Derner et al.
3,998,680 A 12/1976 Flint
4,080,482 A 3/1978 Lacombe
4,109,431 A 8/1978 Mazzoni et al.
4,198,254 A 4/1980 Laroche et al.
4,226,063 A 10/1980 Chenel
4,479,988 A 10/1984 Dawson
4,613,530 A 9/1986 Hood et al.
4,658,552 A 4/1987 Mulford
4,658,553 A 4/1987 Shinagawa
4,799,745 A 1/1989 Meyer et al.
4,831,799 A 5/1989 Glover et al.
5,007,217 A 4/1991 Glover et al.
5,071,206 A 12/1991 Hood et al.
5,079,054 A 1/1992 Davies
5,125,195 A 6/1992 Brede
5,173,800 A 12/1992 King
5,209,034 A 5/1993 Box et al.
5,270,092 A 12/1993 Griffith et al.
5,290,611 A 3/1994 Taylor
5,302,425 A 4/1994 Taylor
5,313,762 A 5/1994 Guillemet
5,424,111 A 6/1995 Farbstein
5,439,716 A 8/1995 Larsen
5,460,862 A 10/1995 Roller
5,512,341 A 4/1996 Newby et al.
5,675,944 A 10/1997 Kerr et al.
5,679,419 A 10/1997 Larsen
5,762,257 A 6/1998 Garrecht
5,773,135 A 6/1998 Lafond
5,851,627 A 12/1998 Farbstein
5,962,090 A 10/1999 Trautz
6,001,453 A 12/1999 Lafond
6,002,521 A 12/1999 Town
6,061,994 A 5/2000 Goer et al.
6,223,414 B1 5/2001 Hodek et al.
6,250,045 B1 6/2001 Goer et al.
6,250,245 B1 6/2001 Robinson et al.
6,266,940 B1 7/2001 Reichert
6,339,909 B1 1/2002 Brunnhofer et al.
6,351,923 B1 3/2002 Peterson
6,389,779 B1 5/2002 Brunnhofer
6,391,400 B1 5/2002 Russell
6,457,294 B1 10/2002 Virnelson et al.
6,528,131 B1 3/2003 Lafond
6,537,629 B1 3/2003 Ensinger
6,613,404 B2 9/2003 Johnson
6,796,102 B2 9/2004 Virnelson et al.
6,989,188 B2 1/2006 Brunnhofer et al.
7,827,760 B2 11/2010 Brunnhofer et al.
7,858,193 B2 12/2010 Ihlo et al.
7,997,037 B2 8/2011 Crandell et al.
8,453,415 B2 6/2013 Brunnhofer et al.
8,484,912 B2 7/2013 Engelmeyer
8,640,406 B2 2/2014 Brunnhofer et al.
8,701,363 B2 * 4/2014 Schield ............. B32B 17/10045 428/331
9,085,708 B2 7/2015 Decker et al.
9,260,906 B2 2/2016 Schreiber
9,487,994 B2 11/2016 Lenz et al.
2001/0001357 A1 5/2001 Reichert
2002/0192473 A1 12/2002 Gentilhomme et al.
2003/0074859 A1 4/2003 Reichert et al.
2004/0163347 A1 8/2004 Hodek et al.
2004/0256978 A1 12/2004 Yu et al.
2005/0034386 A1 2/2005 Crandell et al.
2005/0100691 A1 * 5/2005 Bunnhofer .......... E06B 3/66319 428/34
2005/0170161 A1 8/2005 Ramchandra et al.
2005/0214487 A1 9/2005 Trautz
2005/0217718 A1 10/2005 Dings et al.
2005/0287370 A1 12/2005 Kaczmarek et al.
2006/0130427 A1 6/2006 Hodek et al.
2006/0150577 A1 7/2006 Hodek et al.
2006/0162281 A1 7/2006 Pettit et al.
2006/0260227 A1 11/2006 Winfield
2007/0122572 A1 5/2007 Shibuya et al.
2007/0261358 A1 11/2007 Davis et al.
2007/0261795 A1 11/2007 Rosskamp et al.
2008/0053037 A1 3/2008 Gallagher
2008/0134596 A1 6/2008 Brunnhofer et al.
2009/0120019 A1 5/2009 Trpkovski
2009/0120035 A1 5/2009 Trpkovski
2009/0139165 A1 6/2009 Prete et al.
2009/0197077 A1 8/2009 Reutler et al.
2009/0243802 A1 10/2009 Wolf et al.
2009/0301637 A1 12/2009 Reichert
2010/0011703 A1 1/2010 Seele et al.
2010/0107529 A1 5/2010 Engelmeyer
2011/0041427 A1 2/2011 Bouesnard
2011/0275796 A1 11/2011 Seilz et al.
2012/0132251 A1 5/2012 Sedlacek et al.
2012/0141699 A1 6/2012 Mader
2012/0297707 A1 11/2012 Lenz et al.
2014/0138425 A1 5/2014 Meyer et al.
2014/0272207 A1 9/2014 McKenna et al.
2014/0311065 A1 10/2014 Schreiber
2015/0107167 A1 4/2015 Baumann et al.
2016/0069123 A1 3/2016 Schreiber
2016/0201381 A1 7/2016 Kuster et al.
2016/0290032 A1 10/2016 Kuster et al.
2016/0290033 A1 10/2016 Messere
2017/0152701 A1 6/2017 Kuster et al.
2018/0058139 A1 3/2018 Schwerdt et al.

FOREIGN PATENT DOCUMENTS

CN 201083071 Y 7/2008
CN 201100068 Y 8/2008
DE 2555384 C3 3/1982
DE 2752542 C2 10/1989
DE 4032192 A1 6/1991
DE 4024697 A1 2/1992
DE 4432402 A1 3/1996
DE 195 43 148 A1 5/1997
DE 19625845 A1 1/1998
DE 19805348 A1 8/1999
DE 19807454 A1 8/1999
DE 19829151 C1 2/2000
DE 69607473 T2 9/2000
DE 19927683 C1 1/2001
DE 10 2004 028 756 A1 12/2005
DE 102009006062 A1 7/2010
DE 202012104026 U1 10/2013
DE 69633132 T2 8/2015
EP 0 154 428 9/1985
EP 0261923 A2 3/1988
EP 0430889 A2 6/1991
EP 0 597 727 A2 5/1994
EP 0612119 A1 8/1994
EP 0852280 A1 7/1998
EP 0865560 B1 8/2004
EP 0912455 B1 5/2006
EP 1218307 B1 7/2008
EP 1917222 B1 3/2009
EP 2 218 862 A2 8/2010
EP 2359973 A2 8/2011
EP 2363565 A2 9/2011
EP 2420536 A1 2/2012

(56) References Cited

FOREIGN PATENT DOCUMENTS

| | | | |
|---|---|---|---|
| EP | 2628884 | A2 | 8/2013 |
| FR | 2205620 | A1 | 5/1974 |
| JP | H09-175843 | A | 7/1997 |
| JP | H11-247540 | A | 9/1999 |
| JP | 2007-277052 | A | 10/2007 |
| JP | 2008-019131 | A | 1/2008 |
| WO | 2007/101964 | A1 | 9/2007 |
| WO | WO 2009/142825 | A1 | 11/2009 |
| WO | 2011/088994 | A2 | 7/2011 |
| WO | 2013/104507 | A1 | 7/2013 |

OTHER PUBLICATIONS

International Search Report for PCT/EP2015/071452, dated Feb. 12, 2015. 6 pages.
International Search Report for PCT/EP2015/068998, dated Nov. 11, 2015. 4 pages.
Advisory Action issued for U.S. Appl. No. 14/942,902, filed Nov. 16, 2015 on behalf of Saint-Gobain Glass France, dated Jan. 5, 2017. 4 pages.
Amcor. Ceramis Coating Technology, 12 pages, Oct. 2012, available at http://amcor.com/CMSPages/GetFile.aspx?guid=dbab33c8-3471-4e86-aa69-57dc76b525c1.
Final Office Action issued for U.S. Appl. No. 14/357,164, filed May 8, 2014 on behalf of Saint-Gobain Glass France, dated Feb. 9, 2015. 16 pages.
Final Office Action issued for U.S. Appl. No. 14/942,902, filed Nov. 16, 2015 on behalf of Saint-Gobain Glass France, dated Sep. 26, 2016. 33 pages.
Final Office Action issued for U.S. Appl. No. 14/909,073, filed Nov. 16, 2015 on behalf of Saint-Gobain Glass France, dated Sep. 12, 2017. 29 pages.
Final Office Action issued for U.S. Appl. No. 14/942,902, filed Jan. 29, 2016 on behalf of Saint-Gobain Glass France, dated Jun. 20, 2017. 25 pages.
International Preliminary Report on Patentability issued for International Patent Application No. PCT/EP2012/076341, filed on behalf of Saint-Gobain Glass France, dated Jul. 15, 2014. 17 pages (English Translation + German Original).
International Preliminary Report on Patentability issued for International Patent Application No. PCT/EP2014/067901, filed on behalf of Saint-Gobain Glass France, dated Apr. 5, 2016. 15 pages (English Translation + German Original).
International Preliminary Report on Patentability issued for International Patent Application No. PCT/EP2014/076736, filed on behalf of Saint-Gobain Glass France, dated Jun. 14, 2016. 12 pages (English Translation + German Original).
International Preliminary Report on Patentability issued for International Patent Application No. PCT/EP2014/076739, filed on behalf of Saint-Gobain Glass France, dated Jun. 14, 2016. 16 pages (English Translation + German Original).
International Preliminary Report on Patentability for International Application No. PCT/EP2015/063814 filed on Jun. 19, 2015 in the name of Saint-Gobain Glass France. (English translation and German original), dated Dec. 27, 2016. 18 pages.
International Search Report issued for International Patent Application No. PCT/EP2012/076341, filed on behalf of Saint-Gobain Glass France, dated Feb. 8, 2013. 6 pages (English Translation + German Original).
International Search Report issued for International Patent Application No. PCT/EP2014/067901, filed on behalf of Saint-Gobain Glass France, dated Oct. 7, 2014. 5 pages (English Translation + German Original).
International Search Report issued for International Patent Application No. PCT/EP2014/076736, filed on behalf of Saint-Gobain Glass France, dated Mar. 10, 2016. 5 pages (English Translation + German Original).
International Search Report issued for International Patent Application No. PCT/EP2014/076739, filed on behalf of Saint-Gobain Glass France, dated Feb. 3, 2015. 7 pages (English Translation + German Original).
International Search Report issued for International Patent Application No. PCT/EP2015/063821, filed on behalf of Saint-Gobain Glass France, dated Aug. 19, 2015. 5 pages (English Translation + German Original).
International Search Report issued for International Patent Application No. PCT/EP2016/054226, filed on behalf of Saint-Gobain Glass France, dated May 3, 2016. 5 pages (English Translation + German Original).
International Search Report for International Application No. PCT/EP2015/063814 filed on Jun. 19, 2015 in the name of Saint-Gobain Glass France. (English translation and German original), dated Aug. 14, 2015. 5 pages.
Non-Final Office Action issued for U.S. Appl. No. 14/357,164, filed May 8, 2014 on behalf of Saint-Gobain Glass France, dated Sep. 10, 2014. 24 pages.
Non-Final Office Action issued for U.S. Appl. No. 14/357,164, filed May 8, 2014 on behalf of Saint-Gobain Glass France, dated Aug. 10, 2015. 14 pages.
Non-Final Office Action issued for U.S. Appl. No. 14/942,902, filed Nov. 16, 2015 on behalf of Saint-Gobain Glass France, dated Mar. 10, 2016. 28 pages.
Non-Final Office Action issued for U.S. Appl. No. 14/942,902, filed Nov. 16, 2015 on behalf of Saint-Gobain Glass France, dated Apr. 4, 2017. 23 pages.
Non-Final Office Action issued for U.S. Appl. No. 14/942,902, filed Nov. 16, 2015 on behalf of Saint-Gobain Glass France, dated Jan. 3, 2018. 20 pages.
Non-Final Office Action issued for U.S. Appl. No. 14/942,902, filed Nov. 16, 2015 on behalf of Saint-Gobain Glass France, dated Apr. 2, 2018. 21 pages.
Non-Final Office Action issued for U.S. Appl. No. 14/909,073, filed Jan. 29, 2016 on behalf of Saint-Gobain Glass France, dated Apr. 4, 2017. 23 pages.
Non-Final Office Action issued for U.S. Appl. No. 14/909,073, filed Jan. 29, 2016 on behalf of Saint-Gobain Glass France, dated Aug. 25, 2017. 26 pages.
Non-Final Office Action issued for U.S. Appl. No. 15/038,356, filed May 20, 2016 on behalf of Saint-Gobain Glass France, dated Feb. 22, 2018. 24 pages.
Non-Final Office Action issued for U.S. Appl. No. 15/038,298, filed May 20, 2016 on behalf of Saint-Gobain Glass France, dated Dec. 28, 2017. 15 pages.
Non-Final Office Action issued for U.S. Appl. No. 15/321,170, filed Dec. 21, 2016 on behalf of Saint-Gobain Glass France, dated Mar. 22, 2018. 24 pages.
Non-Final Office Action issued for U.S. Appl. No. 15/321,161, filed Dec. 21, 2016 on behalf of Saint-Gobain Glass France, dated Mar. 20, 2018. 15 pages.
Notice of Allowance issued for U.S. Appl. No. 14/357,164, filed May 8, 2014 on behalf of Saint-Gobain Glass France, dated May 18, 2015. 12 pages.
Notice of Allowance issued for U.S. Appl. No. 14/357,164, filed May 8, 2014 on behalf of Saint-Gobain Glass France, dated Jun. 22, 2015. 8 pages.
Notice of Allowance issued for U.S. Appl. No. 14/357,164, filed May 8, 2014 on behalf of Saint-Gobain Glass France, dated Sep. 28, 2015. 12 pages.
Notice of Allowance issued for U.S. Appl. No. 14/357,164, filed May 8, 2014 on behalf of Saint-Gobain Glass France, dated Nov. 23, 2015. 14 pages.
Notice of Allowance issued for U.S. Appl. No. 14/038,298, filed May 20, 2016 on behalf of Saint-Gobain Glass France, dated May 31, 2018. 12 pages.
Restriction Requirement issued for U.S. Appl. No. 15/038,356, filed May 20, 2016 on behalf of Saint-Gobain Glass France, dated Jan. 16, 2018. 7 pages.

(56) References Cited

OTHER PUBLICATIONS

Written Opinion issued for International Patent Application No. PCT/EP2012/076341, filed on behalf of Saint-Gobain Glass France, dated Feb. 8, 2013. 15 pages (English Translation + German Original).
Written Opinion issued for International Patent Application No. PCT/EP2014/067901, filed on behalf of Saint-Gobain Glass France, dated Oct. 7, 2014. 13 pages (English Translation + German Original).
Written Opinion issued for International Patent Application No. PCT/EP2014/076736, filed on behalf of Saint-Gobain Glass France, dated Mar. 10, 2016. 10 pages (English Translation + German Original).
Written Opinion issued for International Patent Application No. PCT/EP2014/076739, filed on behalf of Saint-Gobain Glass France, dated Feb. 3, 2015. 14 pages (English Translation + German Original).
Written Opinion issued for International Patent Application No. PCT/EP2015/063814, filed on behalf of Saint-Gobain Glass France, dated Aug. 14, 2015. 16 pages.
Written Opinion issued for International Patent Application No. PCT/EP2015/063821, filed on behalf of Saint-Gobain Glass France, dated Aug. 19, 2015. 16 pages (English Translation + German Original).
Written Opinion issued for International Patent Application No. PCT/EP2016/054226, filed on behalf of Saint-Gobain Glass France, dated May 3, 2016. 9 pages (English Translation + German Original).
Written Opinion for International Application No. PCT/EP2015/063814 filed on Jun. 19, 2015 in the name of Saint-Gobain Glass France. (English translation and German original), dated Aug. 14, 2015. 16 pages.
Opposition by opponent Camvac Limited in European Patent 2,802,726 B1, issued Apr. 27, 2016 to Saint-Gobain Glass France. Mail date: Jan. 27, 2017. 16 pages.
Annex A to opposition by opponent Camvac Limited. "Press notes and articles from 2011". May-Aug. 2011. 4 pages.
Annex B to opposition by opponent Camvac Limited. "Invoices and delivery notes from Thermoseal Group Ltd from Aug. 2011 to Dec. 2011". Aug.-Dec. 2011. 24 pages.
Annex BB to opposition by opponent Camvac Limited. "Invoice and delivery note from Thermoseal Group Ltd of Aug. 2011". Aug. 2011. 2 pages.
Annex C1 to opposition by opponent Camvac Limited. "Thermobar production sheets from Thermoseal Group Ltd of Dec. 22, 2011 and Dec. 23, 2011". Dec. 22 and 23, 2011. 2 pages.
Annex C2 to opposition by opponent Camvac Limited. "Stock Control from Thermoseal Group Ltd from Jun. 8, 2011 to Dec. 22, 2011". Jun. 8, 2011-Dec. 22, 2011. 14 pages.
Annex C3 to opposition by opponent Camvac Limited. "Invoices No. 47197, 47486 and 47812 from Lohmann of Jun. 30, 2011, Aug. 26, 2011 and Oct. 31, 2011". Jun. 30, 2011, Aug. 26, 2011, and Oct. 31, 2011. 3 pages.
Annex CC1 to opposition by opponent Camvac Limited. "Thermobar production sheets from Thermoseal Group Ltd of Aug. 8, 2011 and Sep. 26, 2011". Aug. 8, 2011 and Sep. 26, 2011. 2 pages.
Annex CC2 to opposition by opponent Camvac Limited. "Stock Control from Thermoseal Group Ltd of Jul. 29, 2011 and Sep. 6, 2011". Jul. 29, 2011 and Sep. 6, 2011. 1 page.
Annex CC3 to opposition by opponent Camvac Limited. "Invoice No. 47340 from Lohmann of Jul. 29, 2011". Jul. 29, 2011. 1 page.
Annex D1 to opposition by opponent Camvac Limited. "Preliminary Data Sheet—Duplocoll 40024". No date. 1 page.
Annex E to opposition by opponent Camvac Limited. "Delivery Notes with purchase order Nos. 7621, 7684, 7756, 7757 and 7832 from Camvac Limited of May 24, 2011, Jun. 8 and 29, 2011, Jul. 22, 2011 and Aug. 18, 2011". May 24, 2011, Jun. 8, 2011, Jun. 29, 2011, Jul. 22, 2011, and Aug. 18, 2011. 5 pages.
Annex F1 to opposition by opponent Camvac Limited. "Data Sheet 12/12 Cambrite film from Camvac". No date. 2 pages.
Annex F1A to opposition by opponent Camvac Limited. "Screen shot of Data Sheet12/12 Cambrite film from Camvac". Jan. 19, 2017. 1 page.
Annex F1B to opposition by opponent Camvac Limited. "Declaration of Mr Gary Chalkley (Camvac Product Development Director)". Jan. 24, 2017. 1 page.
Annex F2 to opposition by opponent Camvac Limited. "Declaration of Mr. James Shipman (Camvac Process Development Manager)". Jan. 24, 2017. 2 pages.
Annex G to opposition by opponent Camvac Limited. "Data sheet PSI values for windows having a Thermobar Warm Edge Spacer". Nov. 2014. 1 page.
Opposition by opponent Ensinger GmbH in European Patent 2,802,726 B1, issued Apr. 27, 2016 to Saint-Gobain Glass France. Mail date: Jan. 27, 2017. 44 pages. (English Translation + German Original).
Annex D1A to opposition by opponent Ensinger GmbH. "Affidavit of Mr. Marc Rehling". Jan. 24, 2017. 4 pages. (English Translation + German Original).
Annex D1B to opposition by opponent Ensinger GmbH. "Photography of "Thermobar" Spacer". No date. 1 page.
Annex D1C to opposition by opponent Ensinger GmbH "Test Report AP 16-11-98". Nov. 2016. 8 pages. (German Original Only).
Annex D1D to opposition by opponent Ensinger GmbH. "Figure 5 of D1C with annotations". 13 pages. No date. (English Translation + German Original).
Annex D1E to opposition by opponent Ensinger GmbH. "ATR-Infrared Spectroscopy Measurement of the "Thermobar" Spacer". Dec. 12, 2016. 2 pages. (English Translation + German Original).
Annex D1F to opposition by opponent Ensinger GmbH. "Expert Opinion on "Thermobar" Spacer". Jan. 18, 2017. 14 pages. (English Translation + German Original).
Annex D2 to opposition by opponent Ensinger GmbH. "Din En Iso 10077-1 in the version dated May 2010". May 2010. 48 pages. (English Translation + German Original).
Annex D7 to opposition by opponent Ensinger GmbH. "Avis Technique [Technical Evaluation] 6/04-1562regarding the Super Spacer Premium and the Super Spacer Premium Plus the Edgetech Europe GmbH". Jan. 4, 2005. 46 pages. (English Translation + German Original).
Opposition by opponent Helima GmbH in European Patent 2,802,726 B1, issued Apr. 27, 2016 to Saintgobain Glass France. Mail date: Jan. 27, 2017. 159 pages. (English Translation + German Original).
Supplement to opposition by opponent Helima GmbH in European Patent 2,802,726 B1, issued Apr. 27, 2016 to Saint-Gobain Glass France. Mail date: Mar. 23, 2017. 6 pages. (English Translation + German Original).
Annex A1 to opposition by opponent Helima GmbH. "Excerpt from the website of the company Viking regarding Window DK88". Sep. 2012. 4 pages.
Annex A2 to opposition by opponent Helima GmbH. "Excerpt from the Polish website of the patent holder". Nov. 12, 2012. 3 pages. (English Translation + German Original).
Annex A3 to opposition by opponent Helima GmbH. "Technical Opinion 6/13-2124*01 Add of the CSTB". Sep. 24, 2014. 60 pages. (English Translation + French Original).
Annex A4 to opposition by opponent Helima GmbH. "Technical Opinion 6/16-2303 of the CSTB". Jun. 30, 2016. 62 pages. (English Translation + French Original).
Annex A5 to opposition by opponent Helima GmbH. "Datasheet Swisspacer Ultimate". Apr. 2013. 2 pages. (English Translation + German Original).
Annex A6 to opposition by opponent Helima GmbH. "Excerpt from AIMCAL "Metallizing Technical Reference"". May 2012. 2 pages.
Annex A7 to opposition by opponent Helima GmbH. "Excerpt from Frick/Knoll: Baukonstruktionslehre [Structural Design Theory] 2, Ed.34". Hestermann and Rongen, "Frick/Knöll Baukonstruktionslehre 2", pp. 371-372, 2013. 4 pages. (German Original Only).
Annex A8 to opposition by opponent Helima GmbH. "Affidavit". Jan. 27, 2017. 2 pages.
Annex A9 to opposition by opponent Helima GmbH. "Datasheet Sanco ACS Thermix". Jun. 2009. 5 pages. (English Translation + German Original).

(56) References Cited

OTHER PUBLICATIONS

Annex A10 to opposition by opponent Helima GmbH. "Barrier films for vacuum insulation panels (VIP)". Kaczmarek, "Barrier films for vacuum insulation panels (VIP)", 7th International Vacuum Insulation Symposium 2005, pp. 91-98, 2005. 8 pages.
Opposition by opponent Rolltech A/S in European Patent 2,802,726 B1, issued Apr. 27, 2016 to Saintgobain Glass France. Mail date: Jan. 27, 2017. 32 pages.
Annex O1i to opposition by opponent Rolltech A/S. "Ceramis Barrier Films by Alcan Packaging". Mar. 2005. 4 pages.
Annex O1ii to opposition by opponent Rolltech A/S. "'Barrier Films: SiOx Barrier Benefits' by Marius Breune in Paper, Film & Foil Converter". Oct. 1, 2010. 4 pages.
Opposition by opponent Technoform Glass Insulation Holding GmbH in European Patent 2,802,726 B1, issued Apr. 27, 2016 to Saint-Gobain Glass France. Mail Date: Jan. 26, 2017. 55 pages. (English Translation + German Original).
Annex E6a to opposition by opponent Technoform Glass Insulation Holding GmbH. "ISO 10077-1 in the version of 2006". Sep. 15, 2006. 42 pages.
Annex E6b to opposition by opponent Technoform Glass Insulation Holding GmbH. "ISO 10077-2 in the version of 2012". Mar. 1, 2012. 44 pages.
Annex E6c to opposition by opponent Technoform Glass Insulation Holding GmbH. "two data sheets Saint-Gobain Swisspacer from 2008". Oct. 2008. 2 pages.
Opposition by opponent Thermoseal Group Ltd in European Patent 2,802,726 B1, issued Apr. 27, 2016 to Saint-Gobain Glass France. Mail date: Jan. 27, 2017. 20 pages.
Annex A to opposition by opponent Thermoseal Group Ltd. "Press notes and articles from 2011". May-Sep. 2011. 4 pages.
Annex B to opposition by opponent Thermoseal Group Ltd. "Invoices and delivery notes from Thermoseal Group Ltd from Aug. 2011 to Dec. 2011". Aug.-Dec. 2011. 24 pages.
Annex BB to opposition by opponent Thermoseal Group Ltd. "Invoice and delivery note from Thermoseal Group Ltd of Aug. 2011". Aug. 2011. 2 pages.
Annex C1 to opposition by opponent Thermoseal Group Ltd. "Thermobar production sheets from Thermoseal Group Ltd of Dec. 22, 2011 and Dec. 23, 2011". Dec. 22 and 23, 2011. 2 pages.
Annex C2 to opposition by opponent Thermoseal Group Ltd. "Stock Control from Thermoseal Group Ltd from Jun. 8, 2011 to Dec. 22, 2011". Jun. 8, 2011-Dec. 22, 2011. 14 pages.
Annex C3 to opposition by opponent Thermoseal Group Ltd. "Invoices No. 47197, 47486 and 47812 from Lohmann of Jun. 30, 2011, Aug. 26, 2011 and Oct. 31, 2011". Jun. 30, 2011, Aug. 26, 2011, Oct. 31, 2011. 3 pages.
Annex CC1 to opposition by opponent Thermoseal Group Ltd. "Thermobar production sheets from Thermoseal Group Ltd of Aug. 8, 2011 and Sep. 26, 2011". Aug. 8, 2011 and Sep. 26, 2011. 2 pages.
Annex CC2 to opposition by opponent Thermoseal Group Ltd. "Stock Control from Thermoseal Group Ltd of Jul. 29, 2011 and Sep. 6, 2011". Jul. 29, 2011 and Sep. 6, 2011. 1 page.
Annex CC3 to opposition by opponent Thermoseal Group Ltd. "Invoice No. 47340 from Lohmann of Jul. 29, 2011". Jul. 29, 2011. 1 page.
Annex D1 to opposition by opponent Thermoseal Group Ltd. "Preliminary Data Sheet—Duplocoll 40024". No date. 1 page.
Annex D2 to opposition by opponent Thermoseal Group Ltd. "Declaration of Ms Amanda Smith (Lohmann Segment Manager)". Jan. 18, 2014. 1 page.
Annex E to opposition by opponent Thermoseal Group Ltd. "Delivery Notes with purchase order Nos. 7621, 7684, 7756, 7757 and 7832 from Camvac Limited of May 24, 2011, Jun. 8 and 29, 2011, Jul. 22, 2011 and Aug. 18, 2011". Jul. 22, 2011 and Aug. 18, 2011. 6 pages.
Annex F1 to opposition by opponent Thermoseal Group Ltd. "Data Sheet of 12/12 Cambrite film from Camvac". No date. 2 pages.
Annex F1A to opposition by opponent Thermoseal Group Ltd. "Screen shot showing the last date that the 12/12 Cambrite film from Camvac data sheet was modified". Jan. 19, 2017. 1 page.
Annex F2 to opposition by opponent Thermoseal Group Ltd. "Declaration of Mr James Shipman (Camvac Process Development Manager)". Jan. 24, 2017. 2 pages.
Annex G to opposition by opponent Thermoseal Group Ltd. "Data sheet PSI values for windows having a Thermobar Warm Edge Spacer". Nov. 2014. 1 page.
Annex D1C to opposition by opponent Ensinger GmbH (Jan. 27, 2017) in European Patent 2,802,726 B1 (issued to Saint-Gobain Glass France). "Test Report, Light micrographs of two existing polished sections with the designation 2010 and 2011", Institute of Polymertechnology, Nov. 2016, 16 pages (English Translation + German Original).
Annex A7 to opposition by opponent Helima GmbH (Jan. 27, 2017) in European Patent 2,802,726 B1 (issued to Saint-Gobain Glass France). Hestermann and Rongen, "Frick/Knöll Baukonstruktionslehre 2", pp. 371-372, 1996-2013, 10 pages (English Translation + German Original).
Response to notices of opposition against European Patent EP 2 802 726 B1 by the companies Technoform Glass Insulation Holding GmbH (O1), Ensinger GmbH (O2), Camvac Limited (O3), Thermoseal Group Limited (O4), Rolltech A/S (O5), Helima GmbH (O6). Mail Date: Aug. 22, 2017. 119 pages (English Translation + German Original).
M.W. Phaneuf, "Applications of focused ion beam microscopy to materials science specimens", Micron 30. Jan. 28, 1999. pp. 277-288. 12 pages.
Bishop et al., "Metallizing Technical Reference", AIMCAL, May 2012. Title and pp. 21-25. 6 pages.
Reply by opponent Rolltech A/S in European Patent 2,802,726 B1, issued Apr. 27, 2016 to Saintgobain Glass France. Mail date: Feb. 1, 2018. 8 pages.
Exhibit S27c to reply by opponent Rolltech A/S in European Patent 2,802,726 B1, issued Apr. 27, 2016 to Saint-Gobain Glass France. Sep. 12, 2017. 2 pages.
Exhibit S27d to reply by opponent Rolltech A/S in European Patent 2,802,726 B1, issued Apr. 27, 2016 to Saint-Gobain Glass France. Oct. 2010. 6 pages.
Reply by opponent Technoform Glass Insulation Holding GmbH in European Patent 2,802,726 B1, issued Apr. 27, 2016 to Saint-Gobain Glass France. Mail Date: Apr. 20, 2018. 15 pages. (English Translation + German Original).
Response by patentee Saint-Gobain Glass France to opponent's reply papers in European Patent 2,802,726 B1, issued Apr. 27, 2016 to Saint-Gobain Glass France. Mail date: Jun. 18, 2018. 32 pages (English Translation + German Original).
Simmler, H., et al. ,"Vacuum insulation panels for building application Basic properties, aging mechanisms and service life," Energy and Buildings 37, (2005), pp. 1122-1131.
Wolfgang Sorge IfB GmbH "Vacuum insulation in civil engineering" VIP-BAU.DE, Jul. 2010, 39 pages. (with partial English explanation of relevance).
Opposition filed in European Patent No. 3198101, dated May 15, 2019.

* cited by examiner

SPACER FOR INSULATING GLAZING UNITS

CROSS REFERENCE TO RELATED APPLICATIONS

The present application is the U.S. national stage entry of International Patent Application No. PCT/EP2015/071452, filed internationally on Sep. 18, 2015, which, in turn, claims priority to European Patent Application No. 14186342.3, filed on Sep. 25, 2014.

The invention relates to a spacer for insulating glazing units, a method for production thereof, an insulating glazing unit, and use thereof.

The thermal conductivity of glass is lower by roughly a factor of 2 to 3 than that of concrete or similar building materials. However, since panes are designed significantly thinner than comparable elements made of brick or concrete, buildings frequently lose the greatest share of heat via external glazing. The increased costs necessary for heating and air-conditioning systems make up a part of the maintenance costs of the building that must not be underestimated. Moreover, as a consequence of more stringent construction regulations, lower carbon dioxide emissions are required. Insulating glazing units are an important approach to a solution for this. Primarily as a result of increasingly rapidly rising prices of raw materials and more stringent environmental protection constraints, it is no longer possible to imagine the building construction sector without insulating glazings. Consequently, insulating glazing units constitute an increasingly greater share of outward-directed glazings. Insulating glazing units include, as a rule, at least two panes of glass or polymeric materials. The panes are separated from one another by a gas or vacuum space defined by a spacer. The thermal insulating capacity of insulating glass is significantly higher than for single plane glass and can be further increased and improved in triple glazings or with special coatings. Thus, for example, silver-containing coatings enable reduced transmittance of infrared radiation and thus reduce the heating of a building in the summer. In addition to the important property of thermal insulation, optical and aesthetic characteristics increasingly play an important role in the area of architectural glazing.

In addition to the nature and the structure of the glass, the other components of an insulating glazing unit are also of great significance. The seal and especially the spacer have a major influence on the quality of the insulating glazing unit.

The thermal insulating properties of insulating glazing units are quite substantially influenced by the thermal conductivity in the region of the edge seal, in particular of the spacer. With conventional spacers made of aluminum, the formation of a thermal bridge at the edge of the glass occurs due to the high thermal conductivity of the metal. This thermal bridge results, on the one hand, in heat losses in the edge region of the insulating glazing unit and, on the other, with high atmospheric humidity and low outside temperatures, in the formation of condensation on the inner pane in the region of the spacer. In order to solve these problems, thermally optimized, so-called "warm edge" systems, in which the spacers are made of materials with lower thermal conductivity, for instance, plastics, are increasingly used.

A challenge with the use of plastics is the proper sealing of the spacer. Leaks within the spacer can otherwise easily result in a loss of an inert gas between the insulated glazings. In addition to a poorer insulating effect, leaks can also easily result the penetration of moisture into the insulating glazing unit. Condensation formed by moisture between the panes of the insulating glazing unit quite significantly degrades the optical quality and, in many cases, makes replacement of the entire insulating glazing unit necessary. A possible approach for the improvement of the seal and an associated reduction of the thermal conductivity is the application of a barrier foil on the spacer. This foil is usually affixed on the spacer in the region of the outer seal. Customary foil materials include aluminum or high-grade steel, which have good gas tightness. At the same time, the metal surface ensures good adhesion of the spacer to the sealing compound.

WO2013/104507 A1 discloses a spacer with a polymeric main body and an insulation film. The insulation film contains a polymeric film and at least two metallic or ceramic layers, which are arranged alternatingly with at least one polymeric layer, with the outer layers preferably being polymeric layers. The metallic layers have a thickness of less than 1 μm and must be protected by polymeric layers. Otherwise, in the automated processing of spacers, damage of the metallic layers easily occurs during assembly of the insulating glazing units.

EP 0 852 280 A1 discloses a spacer for multipane insulating glazing units. The spacer comprises a metal foil with a thickness less than 0.1 mm on the adhesive bonding surface and glass fiber content in the plastic of the main body. The outer metal foil is exposed to high mechanical stresses during the further processing in the insulating glazing unit. In particular, when spacers are further processed on automated production lines, damage to the metal foil and thus degradation of the barrier effect easily occur.

The object of the invention consists in providing a spacer for an insulating glazing unit, which can be produced particularly economically and enables good sealing with, at the same time, simpler assembly and thus contributes to improved long-term stable insulation action.

The object of the present invention is accomplished according to the invention by a spacer in accordance with the independent claim 1. Preferred embodiments are apparent from the subclaims. A method for producing a spacer according to the invention, an insulating glazing unit according to the invention, and use thereof according to the invention are apparent from further independent claims.

The spacer for multipane insulating glazing according to the invention comprises at least one polymeric main body and a multilayer insulation film. The main body comprises two pane contact surfaces running parallel to one another, an adhesive bonding surface, and a glazing interior surface. The pane contact surfaces and adhesive bonding surfaces are connected to one another directly or, alternatively, via connection surfaces. The preferably two connection surfaces preferably have an angle from 30° to 60° relative to the pane contact surfaces. The insulation film is situated on the adhesive bonding surface or on the adhesive bonding surface and the connection surfaces. The insulation film comprises at least one metal-containing barrier layer, one polymeric layer, and one metal-containing thin layer. In the context of the invention, "a thin layer" refers to a layer with a thickness of less than 100 nm. The metal-containing barrier layer has a thickness of 1 μm to 20 μm and seals the spacer against gas and moisture loss. The metal-containing barrier layer faces the adhesive bonding surface and is bonded to the adhesive bonding surface directly or via an adhesion promoter. In the context of the invention, the layer facing the adhesive bonding surface is the layer of the insulation film that is the least distant of all layers of the insulation film from the adhesive bonding surface of the polymeric main body. The polymeric layer has a thickness of 5 μm to 80 μm and serves for additional sealing. At the same time, the polymeric layer protects the metal-containing barrier layer against mechanical damage during storage and automated assembly of the insulating glazing unit. The metal-containing thin layer has a thickness of 5 nm to 30 nm. It was surprising that by means of such a thin metal-containing layer, an additional barrier effect can be obtained. The metal-containing thin layer is adjacent the polymeric layer, which is particularly advantageous from the standpoint of production technology, since such foils can be produced separately and are economically available.

Thus, the invention provides a spacer that has low thermal conductivity due to low metal content, that is outstandingly sealed by a multilayer barrier, and that is, additionally, economical to produce in large quantities due to the simple structure of the insulation film. In addition, the metal-containing barrier layer is very well protected by the polymeric layer such that no damage to the otherwise sensitive metal-containing barrier layer can occur.

The insulation film preferably comprises the metal-containing barrier layer, the polymeric layer, and the metal-containing thin layer. Already with these three layers, a very good seal is obtained. The individual layers can be bonded by adhesives.

In a preferred embodiment of the spacer according to the invention, the metal-containing thin layer is on the outside and thus faces away from the polymeric main body. According to the invention, the outer layer is, of all the layers of the insulation film, the farthest from the adhesive bonding surface of the polymeric main body. Thus, the metal-containing thin layer faces the sealing layer in the finished insulating glazing unit. The layer sequence in the insulation film, starting from the adhesive bonding surface, is thus: Metal-containing barrier—polymeric layer—metal-containing thin layer. In this arrangement, the thin layer serves not only as an additional barrier against gas loss and moisture penetration but also assumes, at the same time, the role of an adhesion promoter. The adhesion of this thin layer to the customary materials of the outer seal is so outstanding that an additional adhesion promoter can be dispensed with.

In an alternative embodiment, the polymeric layer is on the outside such that the layer sequence in the insulation film starting from the adhesive bonding surface is metal-containing barrier layer—metal-containing thin layer—polymeric layer. In this arrangement, the metal-containing barrier layer is also protected against damage.

In another preferred embodiment, the insulation film includes at least a second metal-containing thin layer. Another metal-containing thin layer improves the barrier effect. Preferably, the metal-containing thin layer is on the outside such that it acts as an adhesion promoter. Particularly preferred is a layer sequence in the insulation film starting from the adhesive bonding surface: metal-containing barrier layer—metal-containing thin layer—polymeric layer—metal-containing thin layer. In this arrangement, the barrier effect is further improved by the second metal-containing thin layer and, at the same time, the outside metal-containing thin layer acts as an adhesion promoter.

The metal-containing thin layer is preferably deposited by a PVD process (physical vapor deposition). Coating methods for films with metal-containing thin layers in the nanometer range are known and are, for example, used in the packaging industry. The metal-containing thin layer can be applied on a polymeric film, for example, by sputtering in the required thickness between 5 nm and 30 nm. Then, this coated film can be laminated with a metal-containing barrier layer in a thickness in the μm-range and, thus, the insulation film for the spacer according to the invention can be obtained. Such coating can be done on one or both sides. Thus, surprisingly, starting from a readily available product, an insulation film, which, in combination with the polymeric main body, delivers a spacer with outstanding sealing, can be obtained in one production step.

Preferably, the insulation film is applied on the adhesive bonding surface, the connection surfaces, and a part of the pane contact surfaces. In this arrangement, the adhesive bonding surfaces and the connection surfaces are completely covered by the insulation film and, in addition, the pane contact surfaces are partially covered. Particularly preferably, the insulation film extends over two-thirds or one-half of the height h of the pane contact surfaces. In this arrangement, a particularly good seal is obtained, since in the finished insulating glazing unit, the insulation film overlaps with the sealant, that is situated between the panes and the pane contact surfaces. Thus, possible diffusion of moisture into the pane Interior and diffusion of gases into or out of the pane Interior can be prevented.

The metal-containing barrier layer preferably contains aluminum, silver, copper, and/or alloys or mixtures thereof. Particularly preferably, the metal-containing layer contains aluminum. Aluminum foils are characterized by particularly good gas tightness. The metallic layer has a thickness of 5 μm to 10 μm, particularly preferably of 6 μm to 9 μm. It was possible to observe particularly good tightness of the insulation film within the layer thicknesses mentioned. Since the metal-containing barrier layer in the structure according to the invention is protected by a polymeric layer, compared to spacers customary in the trade (ca. 30 μm to 100 μm thickness of the metal-containing layers), thinner metal-containing layers can be used, by which means the thermal insulating properties of the spacer are improved.

The metal-containing thin layer preferably contains metals and/or metal oxides. In particular, metal oxides produce good adhesion to the materials of the outer seal when the thin layer is on the outside. Particularly preferably, the metal-containing thin layer is made of aluminum and/or aluminum oxide. These materials produce good adhesion and have, at the same time, a particularly good barrier effect.

The metal-containing thin layer preferably has a thickness of 10 nm to 30 nm, particularly preferably of 15 nm. In such a thickness, a good additional barrier effect is obtained without a degradation of the thermal properties due to formation of a thermal bridge.

In a preferred variant, the insulation film is bonded to the adhesive bonding surface via a non-gassing adhesive, such as, for example, a polyurethane hot-melt adhesive that cures under humidity. This adhesive produces particularly good adhesion between the glass-fiber-reinforced polymeric main body and the metal-containing barrier layer and avoids the formation of gases that diffuse through the spacer into the pane Interior.

The insulation film preferably has gas permeation of less than 0.001 g/(m$^2$ h).

The insulation film can be applied on the main body, for example, glued. Alternatively, the insulation film can be coextruded together with the main body.

The polymeric layer preferably includes polyethylene terephthalate, ethylene vinyl alcohol, polyvinylidene chloride, polyamides, polyethylene, polypropylene, silicones, acrylonitriles, polyacrylates, polymethylmethacrylates, and/or copolymers or mixtures thereof.

The polymeric layer preferably has a thickness of 5 μm to 24 μm, particularly preferably 12 μm. With these thicknesses, the metallic barrier layer lying thereunder is particularly well protected.

The main body preferably has, along the glazing interior surface, a width b of 5 mm to 45 mm, particularly preferably 8 mm to 20 mm. The precise diameter is governed by the dimensions of the insulating glazing unit and the desired size of the intermediate space.

The main body preferably has, along the pane contact surfaces, an overall height g of 5.5 mm to 8 mm, particularly preferably 6.5 mm.

The main body preferably contains a desiccant, preferably silica gels, molecular sieves, $CaCl_2$, $Na_2SO_4$, activated carbon, silicates, bentonites, zeolites, and/or mixtures thereof. The desiccant can be incorporated both inside a central hollow space or into the glass-fiber-reinforced polymeric main body itself. The desiccant is preferably contained inside the central hollow space. The desiccant can then be filled immediately before the assembly of the insulating glazing unit. Thus, a particularly high absorption capacity is ensured in the finished insulating glazing unit. The glazing interior surface preferably has openings that enable absorption of the atmospheric humidity by the desiccant contained in the main body.

The main body preferably contains polyethylene (PE), polycarbonates (PC), polypropylene (PP), polystyrene, polyester, polyurethanes, polymethylmethacrylates, polyacrylates, polyamides, polyethylene terephthalate (PET), polybutylene terephthalate (PBT), preferably acrylonitrile-butadiene-styrene (ABS), acrylonitrile-styrene-acrylester (ASA), acrylonitrile-butadiene-styrene polycarbonate (ABS/PC), styrene-acrylonitrile (SAN), PET/PC, PBT/PC, and/or copolymers or mixtures thereof.

The main body is preferably glass fiber reinforced. The coefficient of thermal expansion of the main body can be varied and adjusted through the selection of the glass fiber content. By adjustment of the coefficient of thermal expansion of the main body and of the insulation film, temperature related stresses between the different materials and flaking of the insulation film can be avoided. The main body preferably has a glass fiber content of 20% to 50%, particularly preferably of 30% to 40%. The glass fiber content in the main body simultaneously improves the strength and stability.

The invention further includes an insulating glazing unit comprising at least two panes, a spacer according to the invention arranged peripherally between the panes in the edge region of the panes, a sealant, and an outer sealing layer. A first pane lies flat against the first pane contact surface of the spacer and a second pane lies flat against the second pane contact surface. A sealant is applied between the first pane and the first pane contact surface and between the second pane and the second pane contact surface. The two panes protrude beyond the spacer such that a peripheral edge region, which is filled with an outer sealing layer, preferably a plastic sealing compound, is created. The edge space is positioned opposite the inner pane interspace and is bounded by the two panes and the spacer. The outer sealing layer is in contact with the insulation film of the spacer according to the invention. The outer sealing layer preferably contains polymers or silane-modified polymers, particularly preferably polysulfides, silicones, RTV (room temperature vulcanizing) silicone rubber, HTV (high temperature vulcanizing) silicone rubber, peroxide vulcanizing silicone rubber, and/or addition vulcanizing silicone rubber, polyurethanes, butyl rubber, and/or polyacrylates. The panes contain materials such as glass and/or transparent polymers. The panes preferably have optical transparency of >85%, In principle, different geometries of the panes are possible, for example, rectangular, trapezoidal, and rounded geometries. The panes preferably have a thermal protection coating. The thermal protection coating preferably contains silver. In order to be able to maximize energy saving possibilities, the insulating glazing unit can be filled with a noble gas, preferably argon or krypton, which reduce the heat transfer value in the insulating glass unit interspace.

The invention further includes a method for producing a spacer according to the invention comprising the steps

- extrusion of the polymeric main body,
- production of the insulation film by
  - a) applying the metal-containing thin layer on the polymeric layer by a PVD process (physical vapor deposition)
  - b) laminating the layer structure obtained with the metal-containing barrier layer and
- application of the insulation film on the polymeric main body.

The polymeric main body is produced by extrusion. The insulation film is produced in another step. First, for this, a polymeric film is metallized in a PVD process. By this means, the structure comprising a polymeric layer and a metal-containing thin layer necessary for the insulation film is obtained. This process is already used extensively for the production of films in the packaging industry such that the layer structure comprising a polymeric layer and a metal-containing thin layer can be produced economically. In a further step, the metallized polymeric layer is laminated with the metal-containing barrier layer. For this, a thin metal film (corresponding to the metal-containing barrier layer) is bonded to the prepared metallized polymeric layer by lamination.

The metal-containing barrier layer can be applied both on the polymeric layer and on the metal-containing thin layer. In the first case, the metal-containing thin layer is on the outside in the finished insulation film and can thus serve, after application on the spacer, as an adhesion promoter for the material of the outer seal. In the second case, the metal-containing thin layer is on the inside and is thus protected against damage.

Die insulation film is preferably affixed on the adhesive bonding surface of the polymeric main body via an adhesive.

The invention further includes the use of the spacer according to the invention in multipane glazing units, preferably in insulating glazing units.

Figure 2:
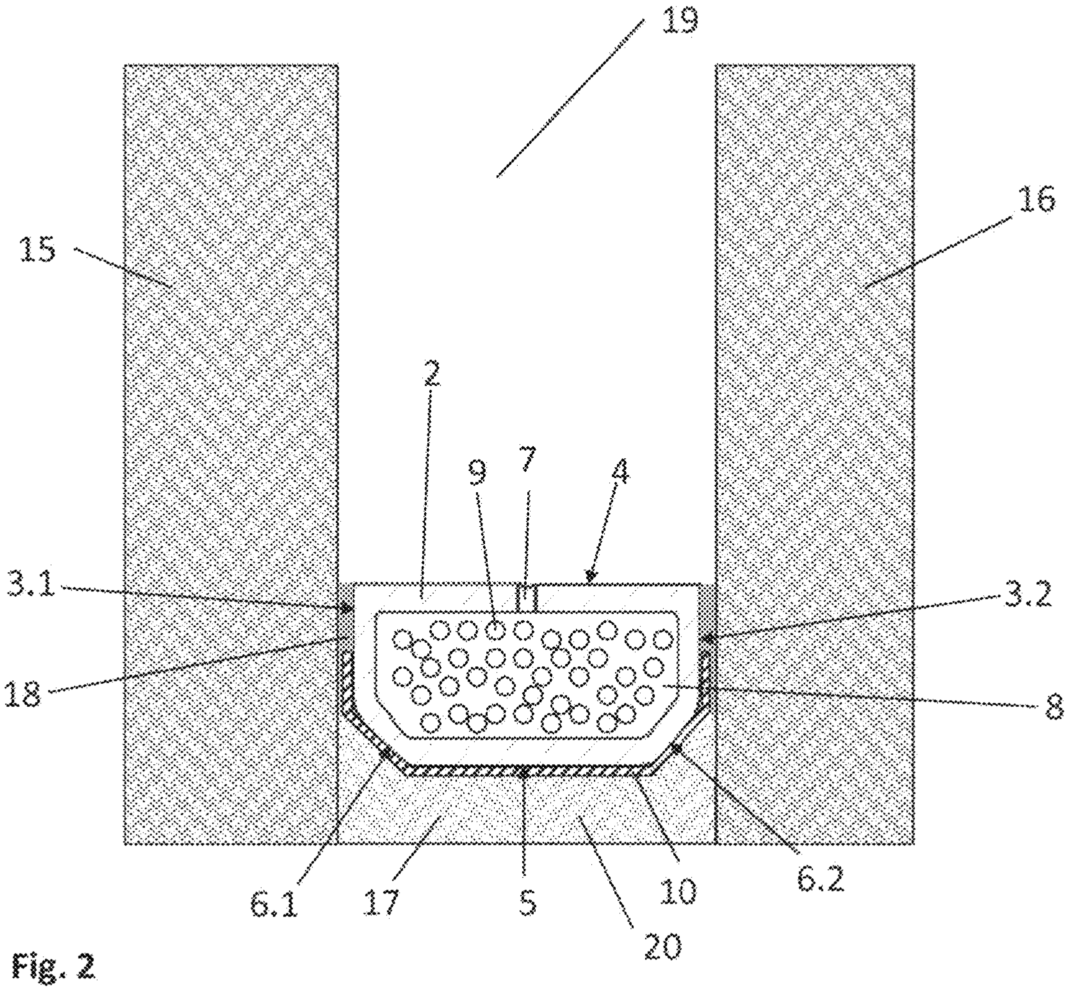
Figure 3:
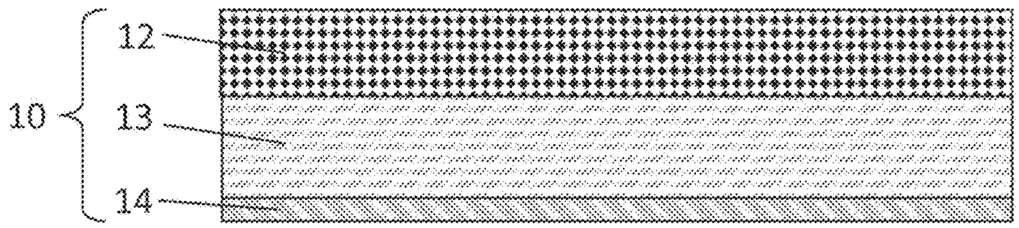
Figure 4:
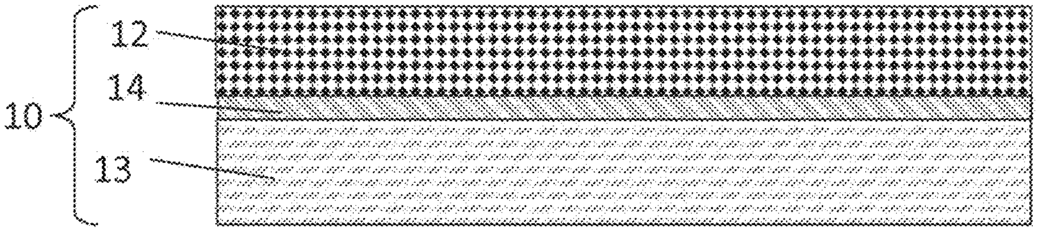
Figure 5:
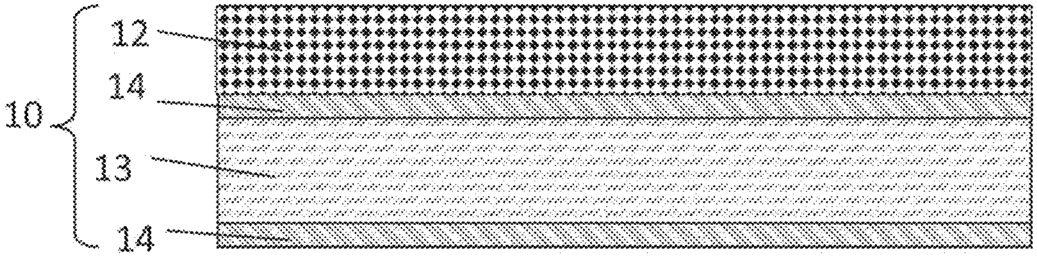
Figure 6:
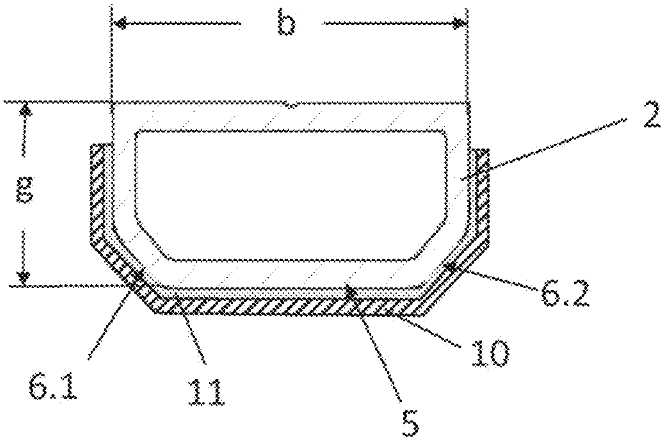

In the following, the invention is explained in detail with reference to drawings. The drawings are purely schematic representations and not true to scale. They in no way restrict the invention. The figures depict:

FIG. 1 a cross-section of the spacer according to the invention,

FIG. 2 a cross-section of the insulating glazing unit according to the invention, FIG. 3 a cross-section of the insulation film according to the invention, and FIG. 4 a cross-section of an alternative embodiment of the insulation film according to the invention, FIG. 5 a cross-section of an alternative embodiment of the insulation film according to the invention, FIG. 6 a cross-section of a spacer according to the invention.

FIG. 1 depicts a cross-section of the spacer 1 according to the invention. The glass-fiber-reinforced polymeric main body 2 comprises two pane contact surfaces 3.1 and 3.2 running parallel to one another, which produce the contact to the panes of an insulating glazing unit. The pane contact surfaces 3.1 and 3.2 are bonded via an outer adhesive bonding surface 5 and a glazing interior surface 4. Preferably, two angled connection surfaces 6.1 and 6.2 are arranged between the adhesive bonding surface 5 and the pane contact surfaces 3.1 and 3.2. The connection surfaces 6.1, 6.2 preferably run at an angle α (alpha) of 30° to 60° relative to the adhesive bonding surface 5. The glass-fiber-reinforced polymeric main body 2 preferably contains styrene acrylonitrile (SAN) and roughly 35 wt.-% of glass fibers. The angled shape of the first connection surface 6.1 and of the second connection surface 6.2 improves the stability of the glass-fiber-reinforced polymeric main body 2 and enables, as depicted in FIG. 2, better adhesive bonding and insulation of the spacer according to the invention. The main body has a hollow space 8 and the wall thickness of the polymeric main body 2 is, for example, 1 mm. The width b (see FIG. 5) of the polymeric main body 2 along the glazing interior surface 4 is, for example, 12 mm. The overall height of the polymeric main body is 6.5 mm. An insulation film 10, which comprises at least a metal-containing barrier layer 12 depicted in FIG. 3, a polymeric layer 13 as well as a metal-containing thin layer 14, is applied on the adhesive bonding surface 5. The entire spacer according to the invention has thermal conductivity of less than 10 W/(m K) and gas permeation of less than 0.001 g/($m^2$ h). The spacer according to the invention improves the insulating effect.

FIG. 2 depicts a cross-section of the insulating glazing unit according to the invention with the spacer 1 described in FIG. 1. The glass-fiber-reinforced polymeric main body 2 with the insulation film 10 affixed thereon is arranged between a first insulating glass pane 15 and a second insulating glass pane 16. The insulation film 10 is arranged on the adhesive bonding surface 5, the first connection surface 6.1 and the second connection surface 6.2 and on a part of the pane contact surfaces. The first pane 15, the second pane 16, and the insulation film 10 delimit the outer edge space 20 of the insulating glazing unit. The outer sealing layer 17, which contains, for example, polysulfide, is arranged in the outer edge space 20. The insulation film 10, together with the outer sealing layer 17, insulates the pane Interior 19 and reduces the heat transfer from the glass-fiber-reinforced polymeric main body 2 into the pane interspace 19. The insulation film can, for example, be affixed with PUR hot-melt adhesive on the polymeric main body 2. A sealant 18 is preferably arranged between the pane contact surfaces 3.1, 3.2 and the insulating glass panes 15, 16. This sealant includes, for example, butyl. The sealant 18 overlaps with the insulation film, to prevent possible interface diffusion. The first insulating glass pane 15 and the second insulating glass pane 16 preferably have the same dimensions and thicknesses. The panes preferably have optical transparency of >85%. The insulating glass panes 15, 16 preferably contain glass and/or polymers, preferably flat glass, float glass, quartz glass, borosilicate glass, soda lime glass, polymethylmethacrylate, and/or mixtures thereof. In an alternative embodiment, the first insulating glass pane 15 and/or the second insulating glass pane 16 can be implemented as composite glass panes. The insulating glazing unit according to the invention forms, in this case, a triple or quadruple glazing unit. Inside the glass-fiber-reinforced polymeric main body 2 is arranged a desiccant 9, for example, a molecular sieve, inside the central hollow space 8. This desiccant 9 can be filled into the hollow space 8 of the spacer 1 before the assembly of the insulating glazing unit. The glazing interior surface 4 includes small openings 7 or pores, which enable a gas exchange with the pane interior 19.

FIG. 3 depicts a cross-section of the insulation film 10 according to the invention. The insulation film 10 comprises a metal-containing barrier layer 12 made of 7-μm-thick aluminum, a polymeric layer made of 12-μm-thick polyethylene terephthalate (PET), and a metal-containing thin layer made of 10-nm-thick aluminum. Polyethylene terephthalate is particularly suited to protect the 7-μm-thick aluminum layer against mechanical damage, since PET films are distinguished by particularly high tear strength. The film layers are arranged such that the aluminum layers, i.e., the metal-containing barrier layer 12 and the metal-containing thin layer 14, are on the outside. The foil is arranged on a polymeric main body according to the invention such that the metal-containing barrier layer 12 faces the adhesive bonding surface 5. Then, the metal-containing thin layer 14 faces outward and acts at the same time as an adhesive layer for the material of the outer sealing layer 17. Thus, the metal-containing thin layer 14 performs not only a barrier effect but also the role of an adhesion promoter. Thus, an effective spacer can be obtained through strategic arrangement of a simple to produce film structure.

The structure of the insulation film 10 according to the invention reduces the thermal conductivity of the insulation film compared to insulation films that are made exclusively of an aluminum foil since the thicknesses of the metal-containing layers of the insulation film 10 according to the invention are thinner. Insulation films that are made of only an aluminum foil have to be thicker since aluminum foils with thicknesses under 0.1 mm are highly sensitive to mechanical damage, which can occur, for example, during automated installation in an insulating glazing unit. A spacer 1 provided with said insulation film 10 according to the invention and the glass-fiber-reinforced polymeric main body 2 has thermal heat conductivity of 0.29 W/(m K). A prior art spacer, in which the insulation film 10 according to the invention is replaced by a 30-μm-thick aluminum layer, has a thermal heat conductivity of 0.63 W/(m K). This comparison shows that, despite lower overall metal content, with the structure according to the invention of the spacer made of a polymeric main body and insulation film, higher mechanical resistance and equivalent impermeability (against gas and moisture diffusion) with, at the same time, lower heat conductivity can be obtained, which significantly increases the efficiency of an insulating glazing unit.

FIG. 4 depicts a cross-section of an alternative embodiment of the insulation film according to the invention. The materials and thicknesses are as described in FIG. 3; however, the sequence of the individual layers is different. The metal-containing thin layer 14 is between the metal-containing barrier layer 12 and the polymeric layer 13. In this arrangement, the metal-containing barrier layer 12 is protected by the polymeric layer 13 against damage, by which means an unrestricted barrier effect is ensured.

FIG. 5 depicts a cross-section of another embodiment of the insulation film according to the invention. The structure of the insulation film 10 is substantially as described in FIG. 4. Additionally, a further metal-containing thin layer 14 is arranged adjacent the polymeric layer 13. This thin layer 14 improves, in particular, the adhesion to the material of the outer sealing layer 17 in the finished insulating glazing unit.

FIG. 6 depicts a cross-section of a spacer according to the invention comprising a glass-fiber-reinforced polymeric main body 2 and an insulation film 10, which is placed on the adhesive bonding surface 5, the connection surfaces 6.1. and 6.2 as well as on roughly two thirds of the pane contact surfaces 3.1 and 3.2. The width b of the polymeric main body along the glazing interior surface 4 is 12 mm and the overall height g of the polymeric main body 2 is 6.5 mm. The structure of the insulation film 10 is as shown in FIG.

3. The insulation film 10 is affixed via an adhesive 11, in this case, a polyurethane hot-melt adhesive. The polyurethane hot-melt adhesive bonds the metal-containing barrier layer 12 facing the adhesive bonding surface 5 particularly well to the polymeric main body 2. The polyurethane hot-melt adhesive is a non-gassing adhesive, to prevent gases from diffusing into the pane Interior 19 and visible condensation from forming there.

LIST OF REFERENCE CHARACTERS (1) spacer
(2) polymeric main body
(3.1) first pane contact surface
(3.2) second pane contact surface
(4) glazing interior surface
(5) adhesive bonding surface
(6.1) first connection surface
(6.2) second connection surface
(7) openings
(8) hollow space
(9) desiccant
(10) insulation film
(11) adhesive
(12) metal-containing barrier layer
(13) polymeric layer
(14) metal-containing thin layer
(15) first pane
(16) second pane
(17) outer sealing layer
(18) sealant
(19) pane interior
(20) outer edge space of the insulating glazing unit
h height of the pane contact surfaces
b width of the polymeric main body along the glazing interior surface
g overall height of the main body along the pane contact surfaces

The invention claimed is:

1. A spacer for multipane insulating glazing units, comprising:
- a polymeric main body including:
  - two pane contact surfaces running parallel to one another,
  - a glazing interior surface,
  - an adhesive bonding surface, wherein the pane contact surfaces and the adhesive bonding surface are connected to one another directly or via connection surfaces; and
- an insulation film, applied on the adhesive bonding surface, wherein the insulation film includes
  - a metal-containing barrier layer with a thickness of 1 μm to 20 μm facing the adhesive bonding surface,
  - a polymeric layer with a thickness of 5 μm to 80 μm, and
  - a metal-containing thin layer with a thickness of 5 nm to 30 nm adjacent to the polymeric layer,
- wherein the metal-containing barrier layer faces the adhesive bonding surface and is bonded to the adhesive bonding surface directly by means of a non-gassing adhesive, and
- wherein
  - the metal-containing thin layer is on the outside, such that the layer sequence in the insulation film, starting from the adhesive bonding surface, is metal-containing barrier layer, polymeric layer, and metal-containing thin layer, or
  - the polymeric layer is on the outside, such that the layer sequence in the insulation film, starting from the adhesive bonding surface, is metal-containing barrier layer, metal-containing thin layer, and polymeric layer.

2. The spacer according to claim 1, wherein the insulation film completely covers the adhesive bonding surface and the connection surfaces and partially covers the pane contact surfaces.

3. The spacer according to claim 1, wherein the metal-containing barrier layer comprises a metal selected from the group consisting of: aluminum, silver, copper, and alloys thereof.

4. The spacer according to claim 1, wherein the metal-containing barrier layer has a thickness of 5 μm to 10 μm.

5. The spacer according to claim 1, wherein the metal-containing thin layer has a thickness of 10 nm to 20 nm.

6. The spacer according to claim 1, wherein the insulation film is bonded to the adhesive bonding surface via a polyurethane hot-melt adhesive.

7. The spacer according to claim 1, wherein the polymeric layer has a thickness of 5 μm to 24 μm.

8. The spacer according to claim 1, wherein the polymeric main body contains a polymer selected from the group consisting of: polyethylene (PE), polycarbonates (PC), polypropylene (PP), polystyrene, polyester, polyurethanes, polymethylmethacrylates, polyacrylates, polyamides, polyethylene terephthalate (PET), polybutylene terephthalate (PBT), preferably acrylonitrile-butadiene-styrene (ABS), acrylonitrile-styrene-acrylester (ASA), acrylonitrile-butadiene-styrene—polycarbonate (ABS/PC), styrene-acrylonitrile (SAN), PET/PC, PBT/PC, copolymers thereof, and mixtures thereof.

9. The spacer according to claim 1, wherein the polymeric main body is glass fiber reinforced.

10. The spacer according to claim 4, wherein the metal-containing barrier layer has a thickness of 5 μm to 10 μm.

11. The spacer according to one of claim 5, wherein the metal-containing thin layer has a thickness of 14 nm to 16 nm.

12. The spacer according to claim 7, wherein the polymeric layer has a thickness of 12 μm.

13. A spacer for multipane insulating glazing units, comprising:
- a polymeric main body, including
  - two pane contact surfaces running parallel to one another,
  - a glazing interior surface,
  - an adhesive bonding surface, wherein the pane contact surfaces and the adhesive bonding surface are connected to one another directly or via connection surfaces; and
- an insulation film, applied on the adhesive bonding surface, wherein the insulation film includes
  - a metal-containing barrier layer with a thickness of 1 μm to 20 μm facing the adhesive bonding surface,
  - a polymeric layer with a thickness of 5 μm to 80 μm, and
  - a first and second metal-containing thin layers with a thickness of 5 nm to 30 nm adjacent to the polymeric layer,
- wherein the metal-containing barrier layer faces the adhesive bonding surface and is bonded to the adhesive bonding surface directly by means of a non-gassing adhesive, and
- wherein the second metal-containing thin layer is on the outside, such that the layer sequence in the insulation film, starting from the adhesive bonding surface, is metal-containing barrier layer, the first metal-containing thin layer, polymeric layer, and the second metal-containing thin layer.

* * * * *